(12) United States Patent
Yoshiura et al.

(10) Patent No.: US 9,936,085 B2
(45) Date of Patent: *Apr. 3, 2018

(54) IMAGE TRANSMISSION APPARATUS

(71) Applicant: SHARP KABUSHIKI KAISHA, Osaka-shi, Osaka (JP)

(72) Inventors: Syouichirou Yoshiura, Nara (JP); Yuji Okamoto, Kyoto (JP); Katsuyoshi Fujiwara, Osaka (JP); Naofumi Ueda, Kyoto (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,507

(22) Filed: Feb. 19, 2016

(65) Prior Publication Data

US 2016/0173706 A1 Jun. 16, 2016

Related U.S. Application Data

(63) Continuation of application No. 10/549,187, filed as application No. PCT/JP2004/003243 on Mar. 11, 2004, now Pat. No. 9,300,838.

(30) Foreign Application Priority Data

Mar. 19, 2003 (JP) ................................ 2003-076482

(51) Int. Cl.
*G06F 15/16* (2006.01)
*H04N 1/00* (2006.01)
(Continued)

(52) U.S. Cl.
CPC ..... *H04N 1/00212* (2013.01); *H04N 1/00209* (2013.01); *H04N 1/00411* (2013.01);
(Continued)

(58) Field of Classification Search
CPC ...... H04N 1/00206; H04N 2201/0093; H04M 1/67; H04M 1/673; H04M 1/675
See application file for complete search history.

(56) References Cited

U.S. PATENT DOCUMENTS

| 5,438,433 A | 8/1995 | Reifman et al. |
| 5,539,530 A | 7/1996 | Reifman et al. |

(Continued)

FOREIGN PATENT DOCUMENTS

| JP | 3-29461 A | 2/1991 |
| JP | 3-179938 A | 8/1991 |

(Continued)

OTHER PUBLICATIONS

Advisory Action issued in U.S. Appl. No. 10/549,187 dated Oct. 31, 2014.

(Continued)

Primary Examiner — John MacIlwinen
(74) Attorney, Agent, or Firm — Birch, Stewart, Kolasch & Birch, LLP

(57) ABSTRACT

When an address is inputted through input means for inputting an address of a receiving end, an image transmission apparatus carries out an authentication process that determines whether or not the inputting person is a right authorized person. When it is determined that the corresponding operation is right through the authentication process, the image transmission apparatus transmits image data to the address of the receiving end thus inputted.

5 Claims, 19 Drawing Sheets

(51) Int. Cl.
    *H04N 1/327*    (2006.01)
    *H04N 1/44*     (2006.01)
(52) U.S. Cl.
    CPC ......... *H04N 1/32776* (2013.01); *H04N 1/444*
                (2013.01); *H04N 1/4413* (2013.01); *H04N
                     2201/3205* (2013.01); *H04N 2201/3276*
                        (2013.01); *H04N 2201/3278* (2013.01)

(56) References Cited

U.S. PATENT DOCUMENTS

| | | | |
|---|---|---|---|
| 5,737,523 | A | 4/1998 | Callaghan et al. |
| 5,737,701 | A | 4/1998 | Rosenthal et al. |
| 6,035,217 | A | 3/2000 | Kravitz |
| 6,411,693 | B1 | 6/2002 | McKeeth |
| 6,785,017 | B1 | 8/2004 | Yoshiura |
| 2002/0103862 | A1* | 8/2002 | Burr ............ H04L 63/083 709/204 |
| 2002/0138583 | A1 | 9/2002 | Takayama |
| 2003/0084049 | A1 | 5/2003 | Wiley |
| 2004/0005876 | A1 | 1/2004 | Tuoriniemi |

FOREIGN PATENT DOCUMENTS

| JP | 4-157968 A | 5/1992 |
|---|---|---|
| JP | 7-321895 A | 12/1995 |
| JP | 11-122416 A | 4/1999 |

OTHER PUBLICATIONS

Ishihara, Futoshi. English translation of H07-321895. Published Aug. 12, 1995. pp. 1-4.
Notice of Allowance issued in U.S. Appl. No. 10/549,187 dated Nov. 18, 2015.
Office Action issued in U.S. Appl. No. 10/549,187, dated Apr. 16, 2009.
Office Action issued in U.S. Appl. No. 10/549,187, dated Apr. 22, 2010.
Office Action issued in U.S. Appl. No. 10/549,187, dated Apr. 4, 2014.
Office Action issued in U.S. Appl. No. 10/549,187, dated Aug. 20, 2014.
Office Action issued in U.S. Appl. No. 10/549,187, dated Feb. 14, 2012.
Office Action issued in U.S. Appl. No. 10/549,187, dated Jul. 27, 2011.
Office Action issued in U.S. Appl. No. 10/549,187, dated Nov. 27, 2009.
Office Action issued in U.S. Appl. No. 10/549,187, dated Sep. 16, 2008.

* cited by examiner

FIG. 10

ADDRESS OF RECEIVING END/ONE TOUCH
No.019

☑ E-MAIL   ☐ INTERNET FAX

[NAME OF RECEIVING END]

[E-MAIL ADDRESS]   [CHARACTER RETRIEVING]

[INDEX]

[KEY NAME]   [FORMAT]

[TERMINATION]

FIG. 11

ADDRESS OF RECEIVING END / REVISION / DELETION

TERMINATION

PLEASE SELECT REVISED / DELETED RECEIVING END

| S COMPANY |
| B COMPANY |

TPS

1/1

← →

CUSTOMER | A-E | F-J | K-O | P-T | U-Z

ALPHABETIC ORDER ◀▷ USER

FIG. 12

ADDRESS OF RECEIVING END / ONE TOUCH [DELETION] [TERMINATION]
No. 019
[✓] E-MAIL   [ ] INTERNET FAX
[NAME OF RECEIVING END] S COMPANY
[INDEX] USER 3
[E-MAIL ADDRESS] ppd1@xxx.co.jp  [CHARACTER RETRIEVING] S
[KEY NAME] S COMPANY
[FORMAT] PDF/MMR (G4)

IMAGE TRANSMISSION APPARATUS

CROSS REFERENCE TO RELATED APPLICATIONS

This application is a Continuation Application of co-pending U.S. application Ser. No. 10/549,187 filed on Sep. 16, 2005, which is the National Phase of PCT International Application No. PCT/JP2004/003243 filed on Mar. 11, 2004, which claims priority under 35 U.S.C 119(a) to Patent Application No. 2003-076482 filed in Japan on Mar. 19, 2003, all of which are hereby expressly incorporated by reference into the present application.

TECHNICAL FIELD

The present invention relates to an image transmission apparatus that transmits image data, in particular, an image transmission apparatus that carries out an authentication process upon inputting an address of a receiving end.

BACKGROUND ART

There are image transmission apparatuses, such as fax machines each of which transmits and receives an image that has been read to and from an external apparatus (receiving end) through a communication path (telephone network). In recent years, a transmitting and receiving environment for images in which Internet facsimiles and the like for transmitting and receiving images through a communication network are used has been improved. Moreover, there have been rapid progresses in forming document images into electronic data as well as in data sharing, and a workplace environment which utilizes such a network environment has been established. Under these circumstances, as techniques for forming electronic data and for data sharing progress, it becomes necessary to properly establish a protection (security) environment against data leakage and the like.

Conventionally, means is installed in which a user authentication process is carried out by using a password (identification number) or the like so that when, as a result of collation, the input information is coincident with the authentication information that has been preliminarily registered, the use of an image transmission apparatus is permitted thereafter; thus, by using the user authentication, unapproved use of the image transmission apparatus has been restricted (for example, see Japanese Patent Application Laid Open No. 3-29461 (1991) and Japanese Patent Application Laid Open No. 4-157968 (1992)).

However, in such a case when collation information like a password is leaked, the image transmission apparatus might be used without permission with the result that image information might be transmitted to an external apparatus. Moreover, in an attempt to directly input information of a receiving end, the user's unaccustomed operation might cause input errors, with the result that image data might be transmitted to an erroneous receiving end. Particularly, in recent years, the network environment has been established, and techniques for forming electronic data have been improved, as described above, so that image information can be easily transmitted to an external apparatus; consequently, the above-mentioned problems have been recognized remarkably. In contrast, when the security is enhanced excessively, another problem arises in which the image transmission apparatus becomes inconvenient in use.

DISCLOSURE OF THE INVENTION

The present invention has been made in view of the above-mentioned circumstances, and it is an object of the present invention to provide an image transmission apparatus that is capable of preventing the possibility that image data might be erroneously transmitted to the third person, by carrying out an authentication process upon inputting an address of a receiving end for image data.

It is another object of the present invention to provide an image transmission apparatus which is more convenient in use by appropriately selecting and carrying out the authentication process.

An image transmission apparatus according to the present invention is an image transmission apparatus which transmits image data, comprising: input means for inputting an address of a receiving end; authentication means for carrying out an authentication process when the address is inputted by the input means; and transmission means for transmitting image data to the address of the receiving end inputted by said input means, when the input is determined as a right one by the authentication means.

The image transmission apparatus according to the present invention is characterized by further comprising register means for registering the address inputted by said input means in an address data file, when the input is determined as a right one by said authentication means.

The image transmission apparatus according to the present invention is characterized by further comprising readout means for reading out an address registered in said address data file, wherein when the address read out by said readout means is edited by the input means, said authentication means carries out the authentication process, and when the input is determined as a right one by said authentication means, said register means registers the edited address in said address data file.

The image transmission apparatus according to the present invention is characterized in that said transmission means transmits image data to said address without carrying out the authentication process by said authentication means when said readout means reads out an address of a receiving end.

The image transmission apparatus according to the present invention is characterized by further comprising selection means for making a selection as to whether or not the authentication process should be carried out by said authentication means.

The image transmission apparatus according to the present invention is characterized in that said image transmission apparatus is an Internet facsimile apparatus, and said address is an electronic mail address.

According to the present invention, when an address is inputted by the input means for inputting an address of a receiving end, the image transmission apparatus carries out an authentication process as to whether or not the inputting person is a right authorized person. When it is determined that the inputting person is a right one through the authentication process, the image transmission apparatus transmits image data to the address of the receiving end that has been inputted. With this configuration, it becomes possible to prevent the problem that the image data might be leaked to the third person through a network.

Moreover, according to the present invention, when the input is determined as a right one by the authentication process, the image transmission apparatus registers the inputted address in the address data file. Moreover, in the case where an address that has been registered is edited, the image transmission apparatus reads out the corresponding address that has been registered in the address data file, and upon editing the address thus read, the authentication process is again carried out. When the input is determined as a right one by the authentication process, the address that has been edited is updated and registered in the address data file. With this configuration, it becomes possible to prevent the problem that the third person with an ill intention might freely alter the receiving end.

Moreover, according to the present invention, when an already registered address of a receiving end is read out from the address data file, the image transmission apparatus transmits image data to the corresponding address without carrying out the authentication process. In other words, it is sufficient to enhance the security, only in the case where an address is newly inputted and when an inputted address is newly registered or edited for revision or the like; therefore, when an already registered address is read out and transmitted, the authentication process is omitted. Therefore, it becomes possible to provide an image transmission apparatus that is more convenient in use with superior security.

Furthermore, according to the present invention, selection can be made as to whether or not the above-mentioned authentication process should be carried out. In other words, upon raising the level of security, the image transmission apparatus is allowed to carry out the authentication process, while, when emphasis is placed on convenience in use rather than security, the image transmission apparatus is not allowed to carry out the authentication process. With this arrangement, it becomes possible to provide an image transmission apparatus that is suitable for the application environment of the user.

BRIEF DESCRIPTION OF THE DRAWINGS

FIG. 10 is an explanatory view that shows yet another image of guide information displayed on the display unit;

FIG. 11 is an explanatory view that shows yet another image of guide information displayed on the display unit;

FIG. 12 is an explanatory view that shows yet another image of guide information displayed on the display unit;

BEST MODE FOR CARRYING OUT THE INVENTION

The following description will specifically explain the present invention, based on the drawings illustrating an embodiment thereof.

Embodiment 1

Figure 1:
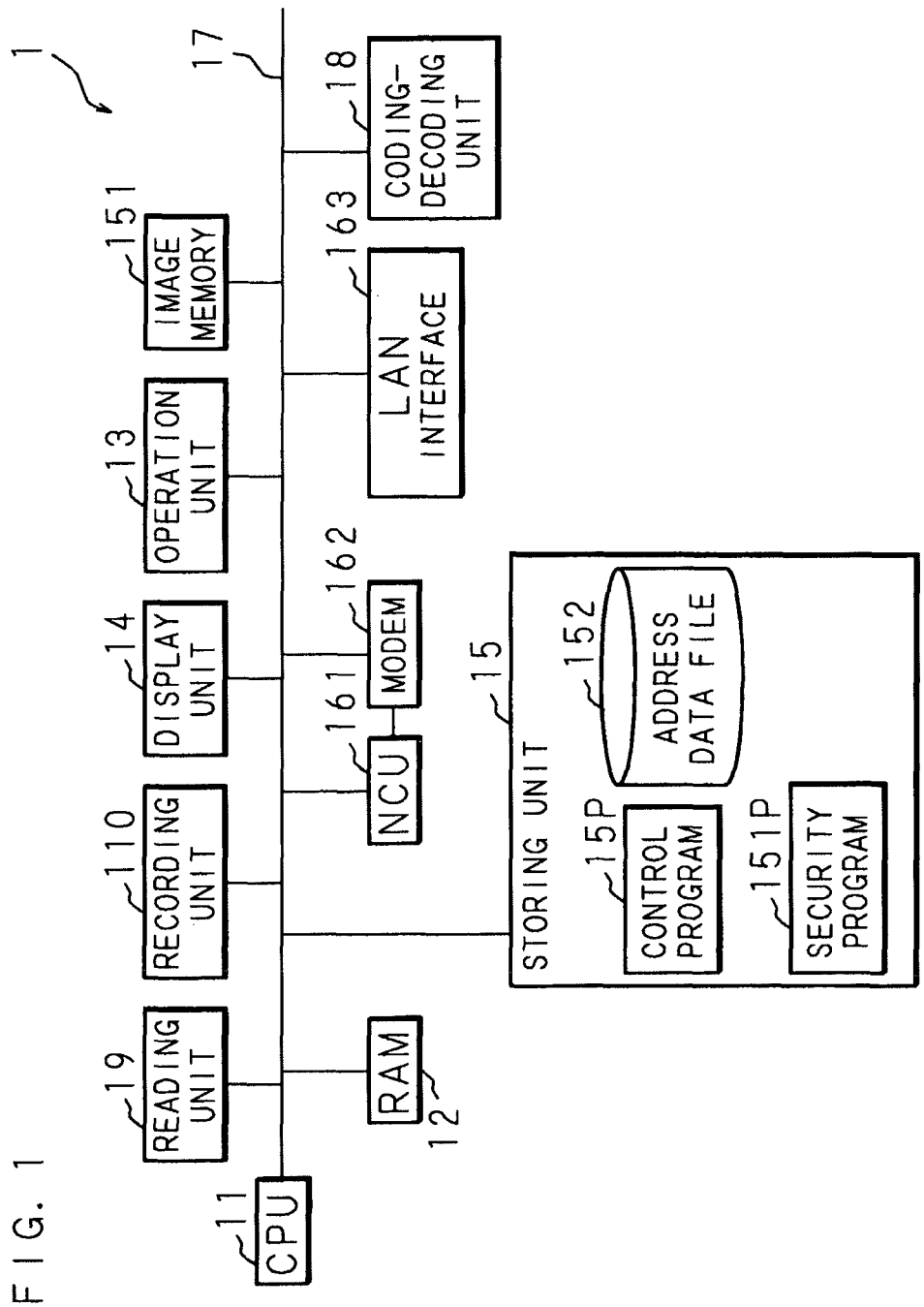
FIG. 1 is a block diagram that shows a hardware structure of an image transmission apparatus according to the present invention.

FIG. 1 is a block diagram that shows a hardware structure of an image transmission apparatus according to the present invention. Here, description will be given of a case in where an Internet facsimile apparatus 1 is used as the image transmission apparatus 1; however, in addition to the apparatus that is provided with only the facsimile function, the apparatus may be a complex machine that has a function as a copying machine and a function as a printer in combination. In the Internet facsimile apparatus 1, a CPU (Central Processing Unit) 11, a reading unit 19, a recording unit 110, a display unit 14, an operation unit 13, a coding-decoding unit 18, a storing unit 15, a RAM (Random Access Memory) 12, an image memory 151, a modem 162, an NCU (Network Control Unit) 161, a LAN interface 163 and the like are connected to one another through a bus 17.

The CPU 11, which is connected to the above-mentioned hardware units of the Internet facsimile device 1 through the bus 17, controls those units, and also executes various software functions in accordance with a control program 15P and a security program 151P stored in the storing unit 15. The reading unit 19 reads a document by using a scanner in which, for example, CCDs (Charge Couple Devices) are utilized, and outputs the image data thus read. The recording unit 110, which is an electrophotographic printing apparatus, is used for printing out data, such as image data received through facsimile communication, document image data read by the reading unit 19 and image data sent from a personal computer (not shown) through the LAN interface 163.

The display unit 14, which is a display device such as a liquid crystal display, is used for displaying the operation state of the Internet facsimile apparatus 1 of the present invention, image data of a document that has been read for transmission, image data received from another facsimile apparatus, and image data sent from a personal computer, or the like. The operation unit 13, serving as input means, is provided with character keys, ten keys, shortened dial keys, one-touch dial keys, various function keys and the like required for operating the Internet facsimile device 1 of the present invention. Here, the display unit 14 may comprise a touch panel, so that one portion or the entire portions of the various keys of the operation unit 13 can be substituted thereby. The coding-decoding unit 18 code-compresses an image signal, and also decodes image data that has been code-compressed into the original image signal.

The storing unit 15, configured by a hard disk or the like, preliminarily stores the control program 15P and the security program 151P that are required for operations of the Internet facsimile device 1 of the present invention. The security program 151P, which is a program that executes an authentication process (authentication means) or the like according to the present invention, is installed when desired by the user. Here, an address of a receiving end, inputted from the operation unit 13, is registered in an address data file 152 of the storing unit 15. Although the address is a FAX number, an electronic mail address or the like, in the following, description will be given by exemplifying a case where the address is an electronic mail address.

The RAM 12, which is configured by a SRAM (Static Random Access Memory), a flash memory or the like, stores temporary data that is generated upon executing a software program. The image memory 151, which is configured by a DRAM (Dynamic Random Access Memory) or the like, stores data such as image data read for transmission, image data received from another facsimile apparatus and image data sent from a computer.

The modem 162, which is connected to the bus 17, is configured by a facsimile modem capable of performing facsimile communication. Moreover, the modem 162 is also directly connected to the NCU 161 connected to the bus 17. The NCU 161, which is a hardware device that opens and closes the communication line with the telephone line network, connects the modem 162 to the telephone line network, if necessary.

Figure 2:
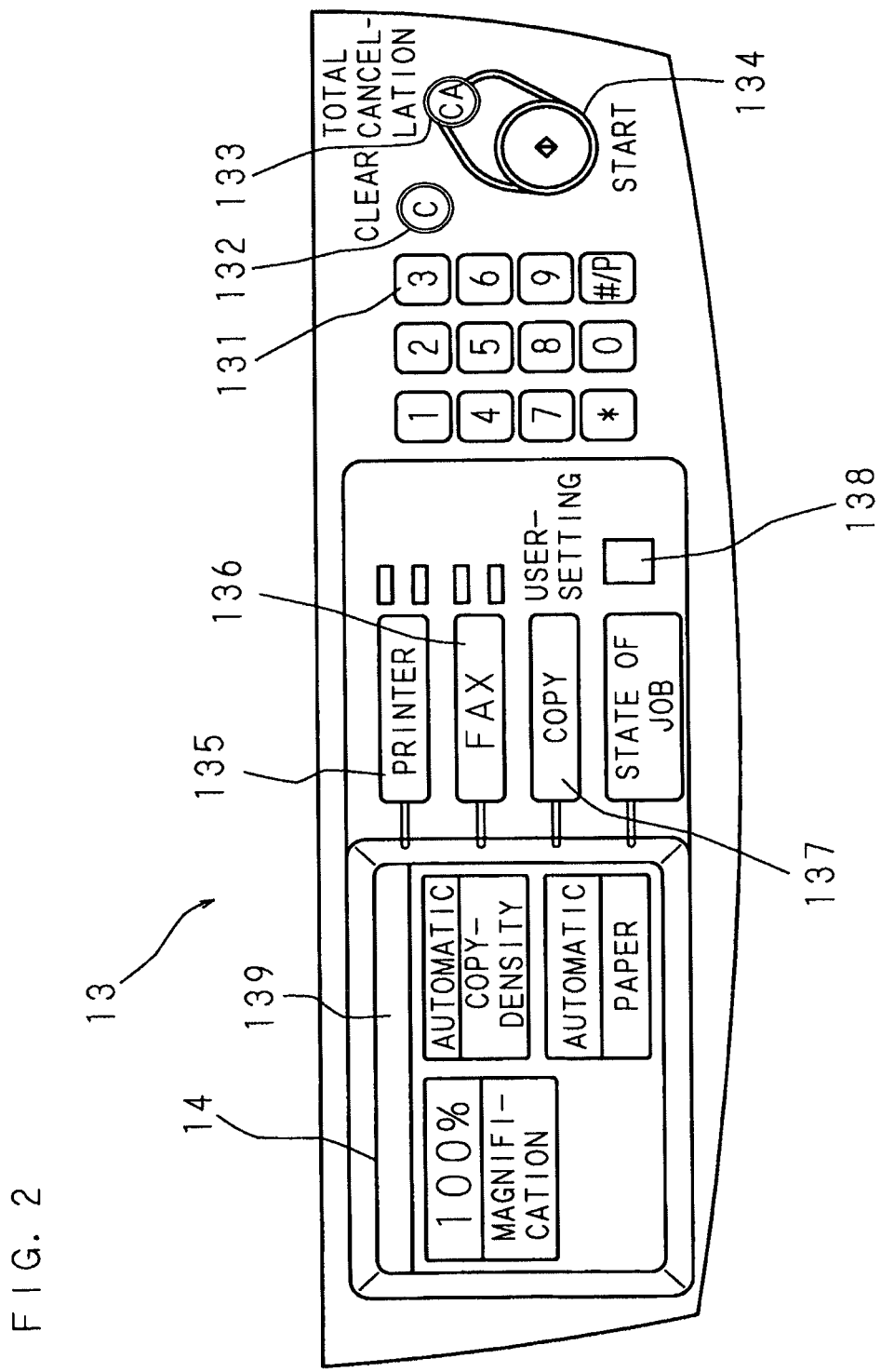
FIG. 2 is a schematic view that shows an operation unit and a display unit.

FIG. 2 is a schematic view that shows the outline of the operation unit 13 and the display unit 14. The display unit 14 is formed by a liquid crystal display, and a touch panel 139, which forms one portion of the operation unit 13, is laminated on the upper side thereof. Various setting operations, such as a copy-density setting operation, a paper selecting operation and a magnification setting operation, can be given through the touch panel 139 by the user's operations. On the right side of the operation unit 13, there are prepared ten keys 131, a clear button 132 by which numeric value data or the like inputted through the ten keys 131 is revised, a start button 134 used for starting a reading process, transmitting process or the like of image data, and a total cancellation button 133, which initializes settings of the number of copies, image quality and the like, or initializes a transmitting operation, a copying operation and the like of image data.

On the center portion adjacent to the touch panel 139 of the operation unit 13, a printer button 135, a FAX button 136, a copy button 137 and a "user-setting" button 138 are prepared. As described above, the Internet facsimile apparatus 1 according to this embodiment has a printer function, a facsimile function and a copy function; therefore, when the user operates the printer button 135, the FAX button 136 or the copy button 137 depending on the desired usage, the Internet facsimile apparatus 1 is allowed to function as a printer, a facsimile apparatus or a copying machine. The "user-setting" button 138 is operated when registering, selecting and editing operations of an address of a receiving end, which will be described later, or various setting operations such as settings of date and time are carried out.

When the operation unit 13 provided with the above-mentioned buttons is operated, a signal corresponding to the operated button is outputted to the CPU 11. In accordance with the control program 15P stored in the storing unit 15, the CPU 11 executes the process corresponding to the output from the operation unit 13, and reads out required guide information from the storing unit 15, and outputs the information to the display unit 14. In the following, description will be given of a sequence of displaying operations on the display unit 14.

Figure 3:
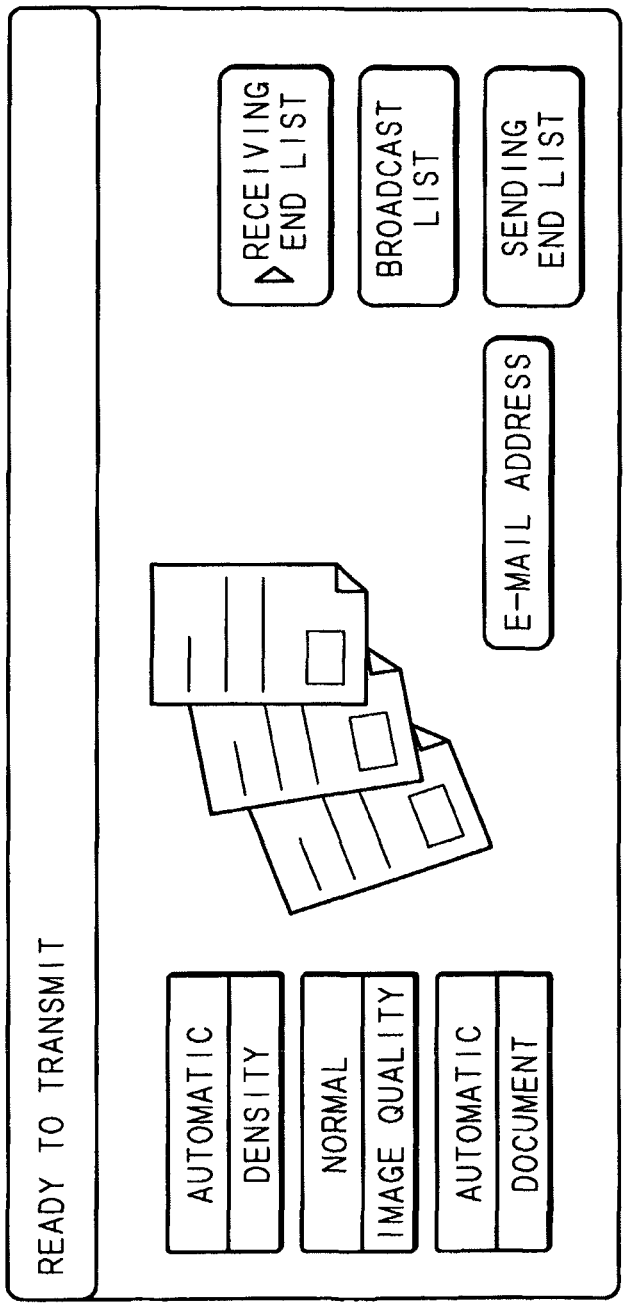
FIG. 3 is an explanatory view that shows an image of guide information displayed on the display unit.
Figure 4:
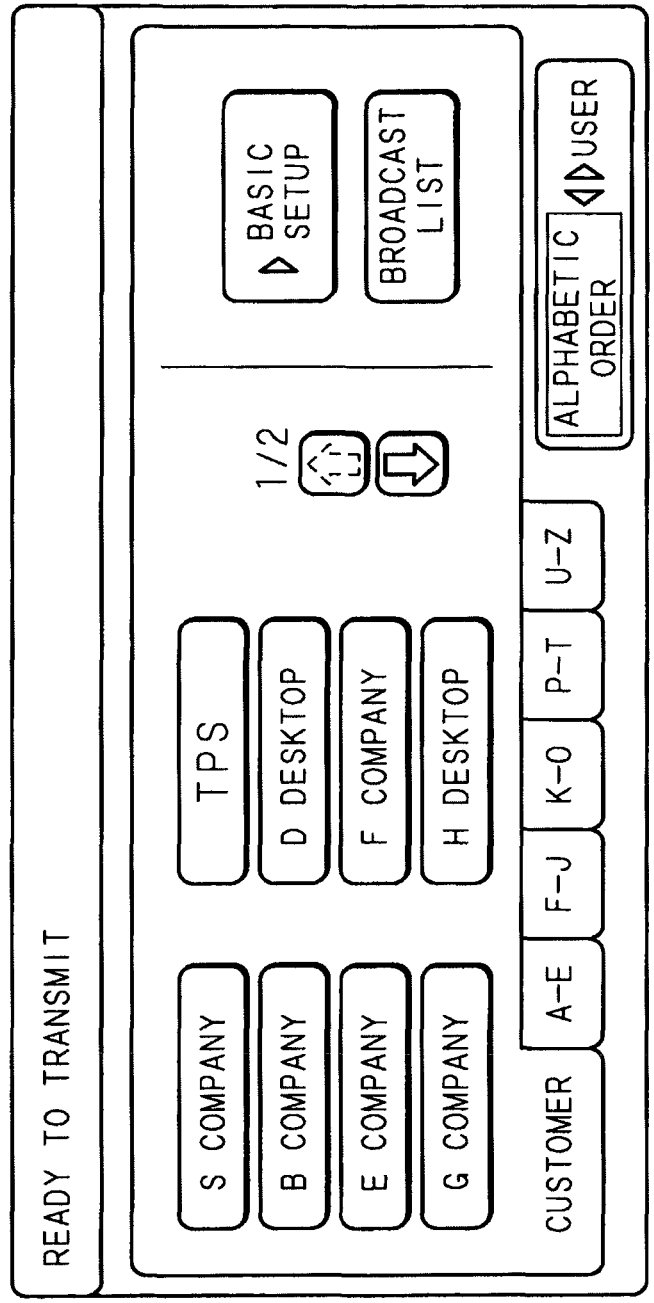
FIG. 4 is an explanatory view that shows another image of guide information displayed on the display unit.

FIGS. 3 through 14 are explanatory views that show images of guide information displayed on the display unit 14. In FIG. 2, when the FAX button 136 is operated, a screen indicated by FIG. 3 is displayed. When "receiving end list" is operated, the CPU 11 reads out names of receiving ends corresponding to addresses that have been registered ("S company", "B company", and the like) from the address data file 152, and displays them as a list, as shown in FIG. 4. Here, when one of the receiving ends is selected through the touch panel 139, the corresponding address is read out from the address data file 152, and image data stored in the image memory 151 is transmitted to the corresponding address. In this manner, when the "receiving end list" is selected so as to call for the registered addresses in FIG. 3, the CPU 11 displays the screen of FIG. 4 without carrying out an authentication process, and allows selection of a desired address.

Figure 5:
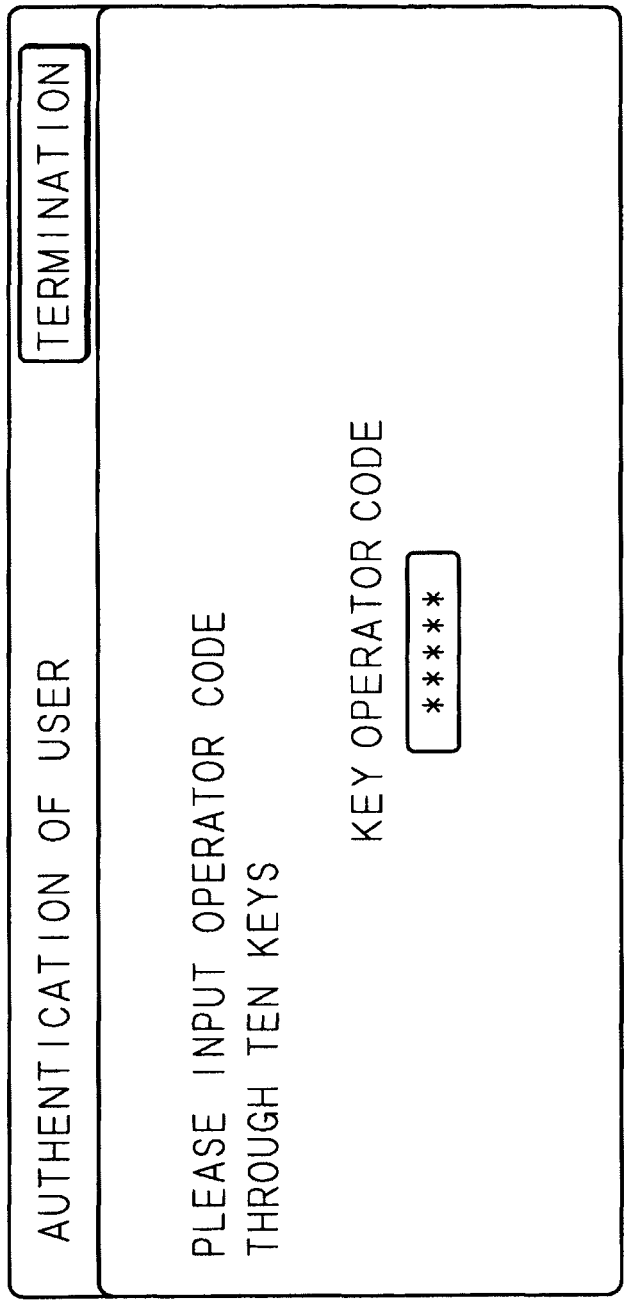
FIG. 5 is an explanatory view that shows still another image of guide information displayed on the display unit.
Figure 6:
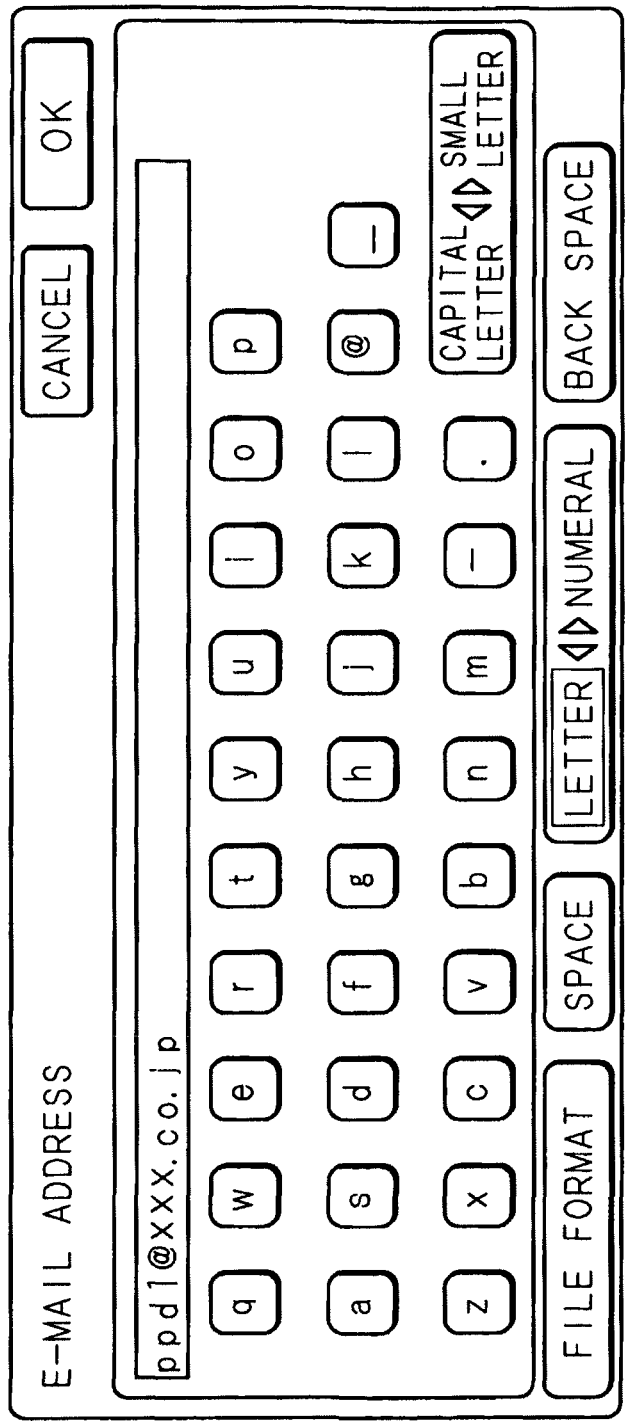
FIG. 6 is an explanatory view that shows yet another image of guide information displayed on the display unit.
Figure 7:
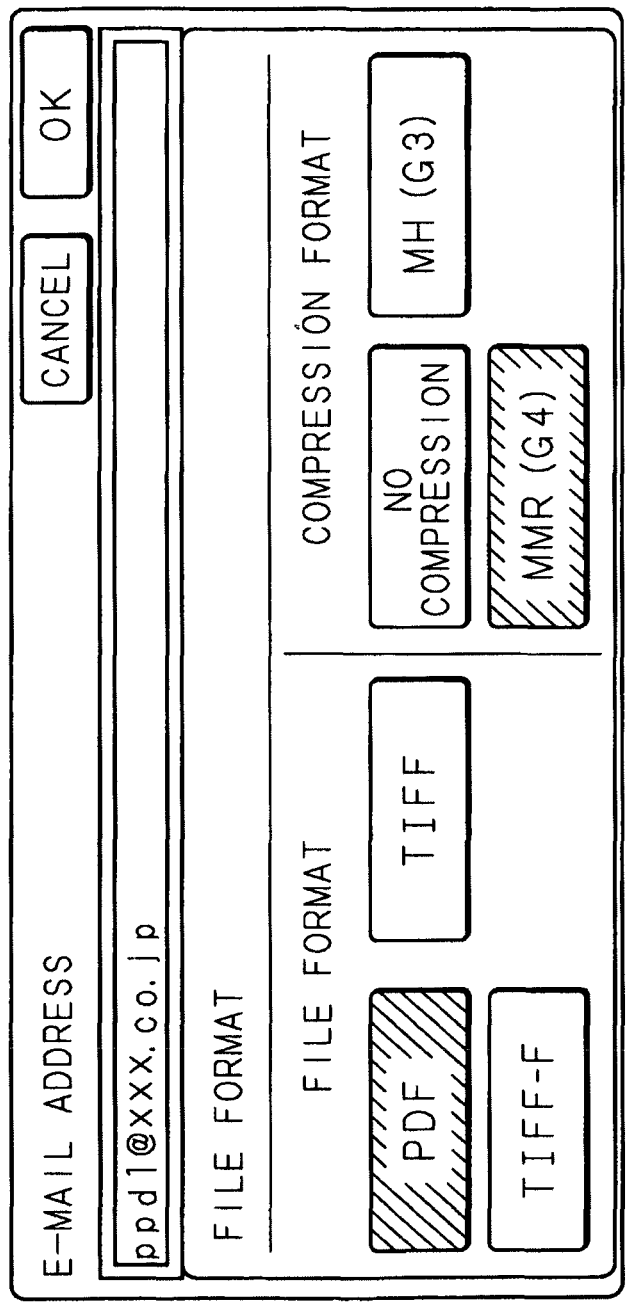
FIG. 7 is an explanatory view that shows yet another image of guide information displayed on the display unit.

In contrast, when "E-MAIL address" button is operated in FIG. 3 so as to input an address that has not been registered, the CPU 11 displays an authentication screen shown in FIG. 5 so as to carry out the authentication process. A screen that urges the user to input a password is displayed on the authentication screen. The user inputs the password through the ten keys 131. The CPU 11 compares the inputted password with a password that has been preliminarily stored in the storing unit 15, and only when these are coincident with each other, it displays an electronic mail address input screen shown in FIG. 6. This embodiment uses the authentication through a password; however, the authentication may be conducted by using biological information such as a fingerprint.

After the authentication process, the user inputs an electronic mail address of a receiving end through the ten keys 131. After the input of the electronic mail address, the user presses "OK" button through the touch panel 139. When the "OK" button is operated, the CPU 11 displays a screen shown in FIG. 7. It is possible to select the file format and compression format of image data to be transmitted in FIG. 7. With respect to the file format, selection can be made among PDF (Personal Document Format) (Registered Trademark), TIFF (Tagged Image File Format) (Registered Trademark), and the like. Moreover, with respect to the compression format, in addition to the case requiring no compression, selection can be made among compression formats such as MH (G (Group) 3) and MMR (G (Group) 4). When the user selects desired file format and compression format, and then selects the "OK" button, the CPU 11 reads out image data from the image memory 151, carries out a converting process to the corresponding file format and the corresponding compressing process on the image data, and then transmits the resulting image data to the electronic mail address that has been inputted.

Figure 8:
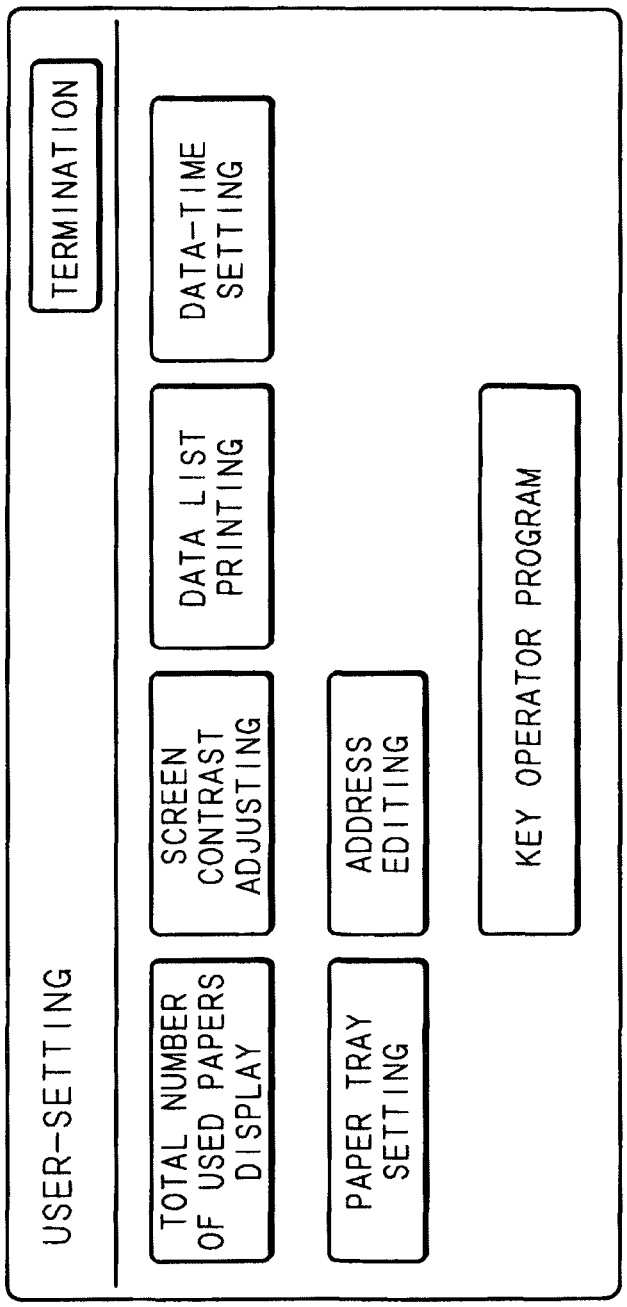
FIG. 8 is an explanatory view that shows yet another image of guide information displayed on the display unit.
Figure 9:
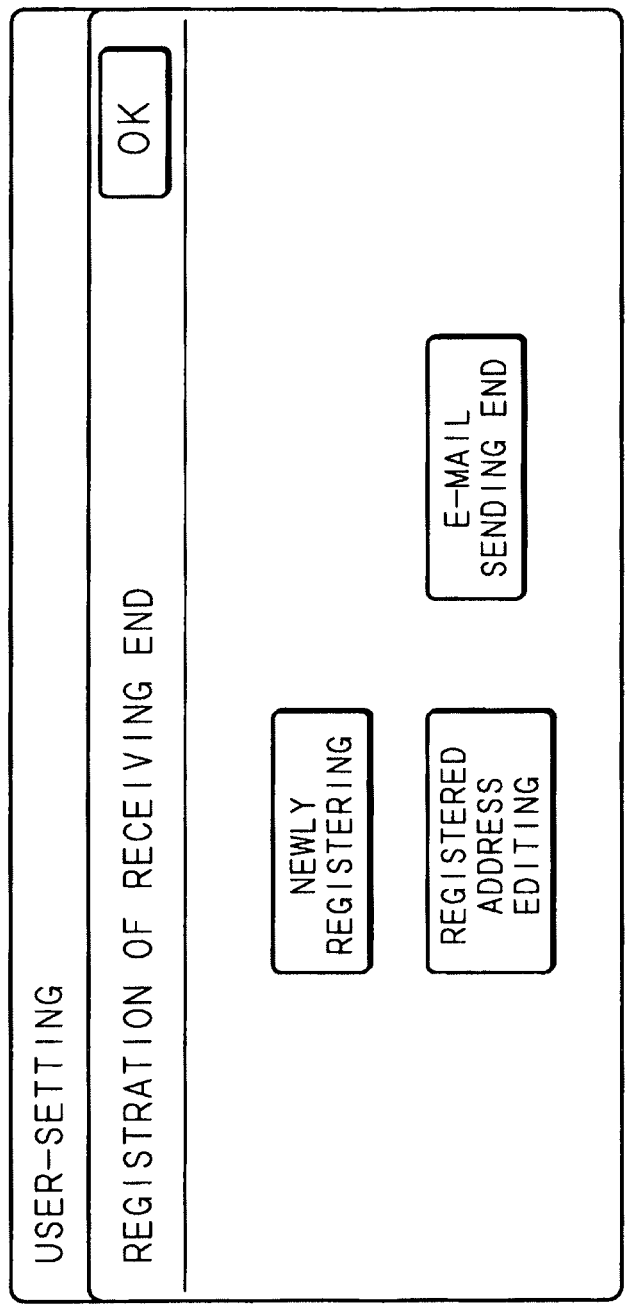
FIG. 9 is an explanatory view that shows yet another image of guide information displayed on the display unit.
Figure 13:
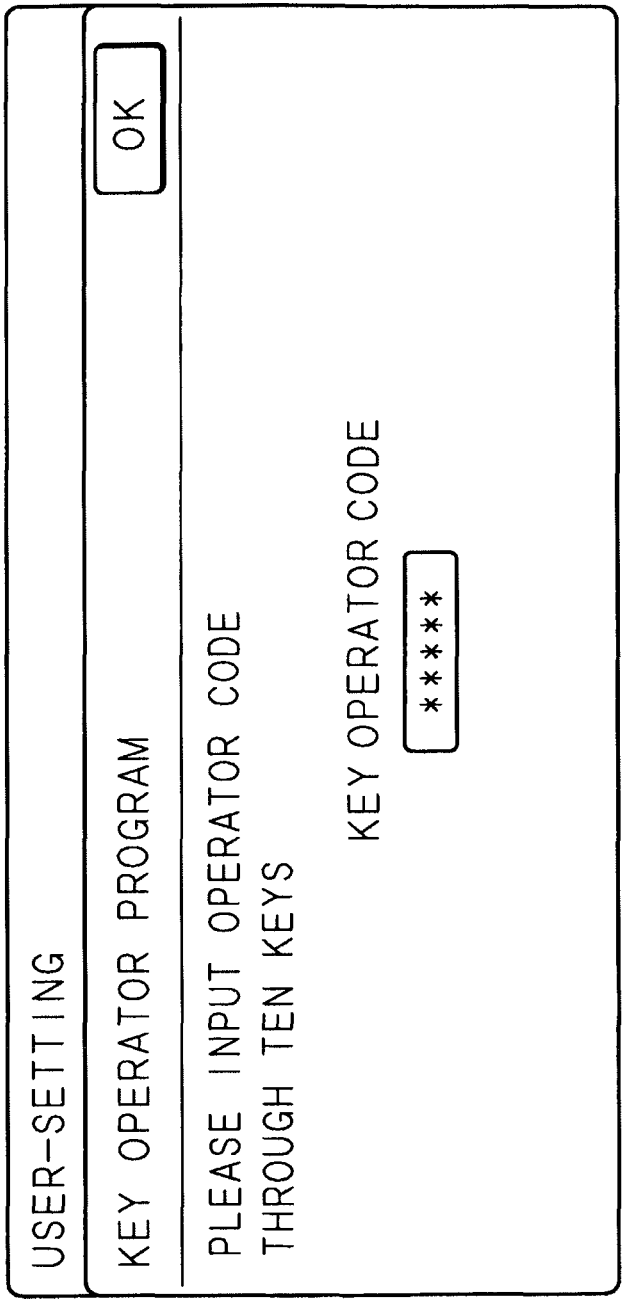
FIG. 13 is an explanatory view that shows yet another image of guide information displayed on the display unit.

In the following, description will be given of a newly registering process of an electronic mail address of a receiving end and an editing process for a registered address. When "user setting" button 138 in FIG. 2 is pressed, the CPU 11 reads out a menu screen shown in FIG. 8 from the storing unit 15, and displays the screen. In the menu screen, items used for carrying out various setting operations, such as screen contrast adjusting, date-time setting and address editing are displayed. When the user operates the "address editing" button, the CPU 11 displays a screen shown in FIG. 9. As shown in FIG. 9, "newly registering" button and "registered address editing" button are displayed. Here, when the user operates the "newly registering" button, the CPU 11 displays the above-mentioned authentication screen shown in FIG. 5 so as to carry out the authentication process.

When it is determined to be right by the authentication process, the CPU 11 displays a screen shown in FIG. 10. The user inputs an electronic mail address and the name and the like of a receiving end corresponding to the electronic mail address by using the ten keys 131 and the like. Upon operation of "termination" button by the user, the inputted address and name of the receiving end are registered in the address data file 152. Thus, when the "receiving end list" button is operated in FIG. 3, the names of the receiving ends are read out from the address data file 152 by the CPU 11, and displayed on the display unit 14 as shown in FIG. 4.

In FIG. 9, when the "registered address editing" button is operated, the CPU 11 displays the above-mentioned authentication screen shown in FIG. 5 so as to carry out the authentication process. When it is determined to be right by the authentication process, the CPU 11 displays a screen shown in FIG. 11. As shown in FIG. 11, the CPU 11 displays names of receiving ends read out from the address data file 152 on the display unit 14 as a list. The user selects a desired name of a receiving end to be edited. Thus, the CPU 11 reads out the electronic mail address and the like corresponding to the name of the receiving end from the address data file 152, and displays them as shown in FIG. 12. The user selects a desired item to be edited (name of a receiving end, electronic mail address, index, character retrieving or the like), and inputs the contents of edition through the ten keys 131. The CPU 11 stores the data that has been edited in the address data file 152. In this manner, when an electronic mail address is directly inputted upon transmission, that is, when an electronic mail address is newly registered in the address data file 152 and when an already registered electronic mail address is edited, the authentication process shown in FIG. 5 is carried out, so that it becomes possible to prevent the problem that the image data might be transmitted to the third person.

Figure 14:
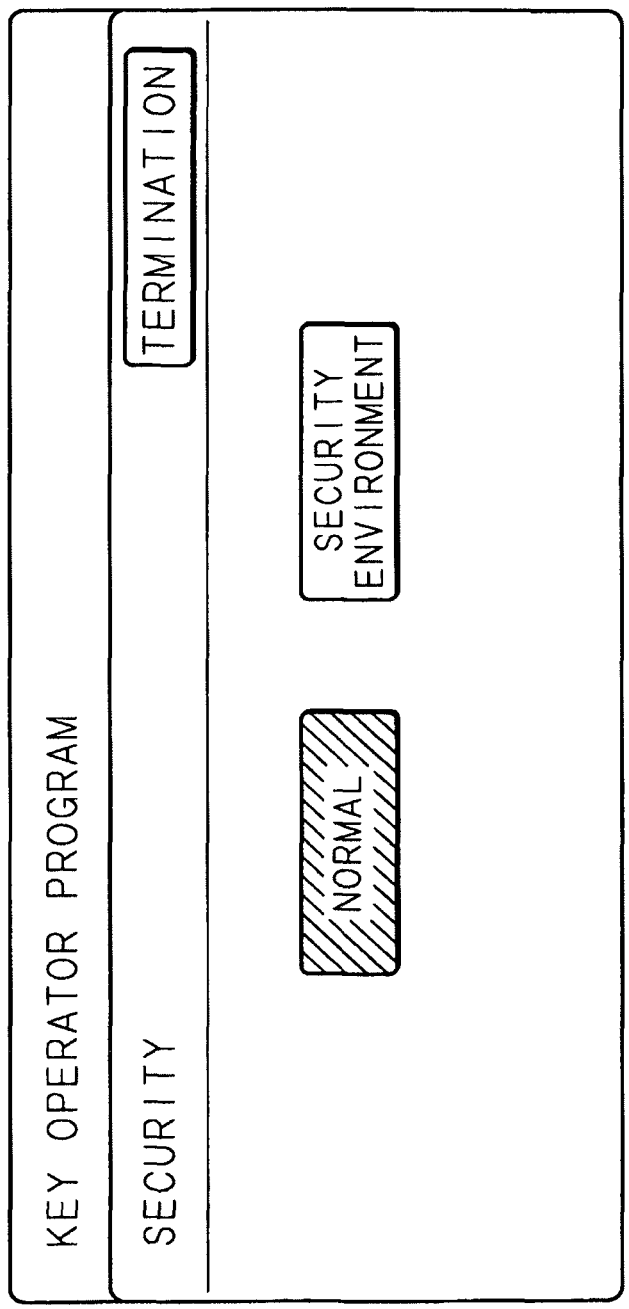
FIG. 14 is an explanatory view that shows yet another image of guide information displayed on the display unit.

Here, the above-mentioned authentication can be cancelled by a user's setup. In the following, description will be given of the contents of the setup procedure. When "key operator program" button is operated on the menu screen in FIG. 8, the CPU 11 displays an authentication screen shown in FIG. 13. The user inputs a password through the ten keys 131. The CPU 11 carries out an authentication process based upon the inputted password, and only when it is determined that the password is right, displays a screen shown in FIG. 14. As shown in FIG. 14, a selection screen that allows selection as to whether or not the authentication process is carried out is displayed. Here, "normal" button is operated when a setup is made so as not to carry out the authentication process upon inputting an electronic mail address. In contrast, "security environment" button is operated when a setup is made so as to carry out the authentication process upon inputting an electronic mail address. Thus, the security can be set appropriately in accordance with the use environment of the user's Internet facsimile apparatus 1.

Figure 15:
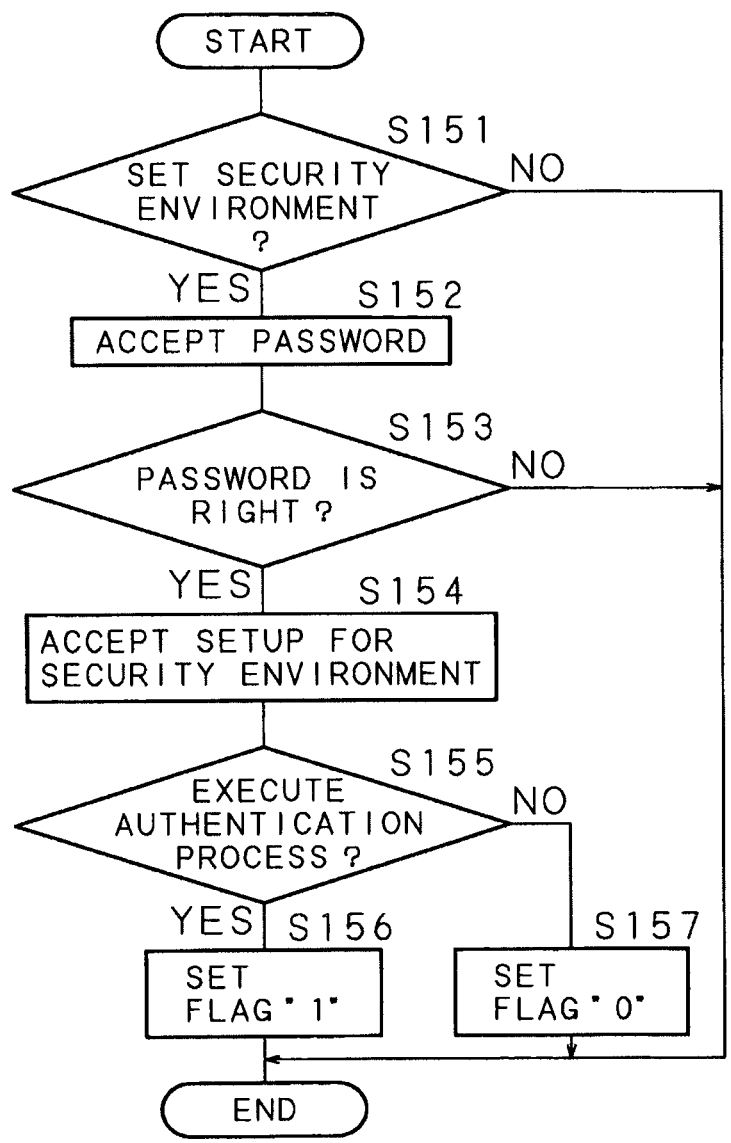
FIG. 15 is a flow chart that shows a sequence of processes for conducting a setting operation as to whether or not authentication processes are carried out.

In the above-mentioned configuration, referring to a flow chart, the sequence of authentication processes of the present invention will be described. FIG. 15 is a flow chart that shows the sequence to be used upon carrying out the setup as to whether or not the authentication processes are carried out. First, the CPU 11 determines whether or not the setup for the security environment is carried out (step S151). More specifically, when the menu screen in FIG. 8 is displayed, in order to allow the user to select whether or not the authentication process should be carried out, it is determined whether or not "key operator program" button has been operated through the touch panel 139. When it is determined that the setup for the security environment is carried out (YES in step S151), that is, when the CPU 11 has received a signal corresponding to the "key operator program" button from the operation unit 14, the CPU 11 reads out the authentication screen shown in FIG. 13 from the storing unit 15 and displays the screen. Then, the CPU 11 accepts an input of a password through the ten keys 131 (step S152). In contrast, upon receiving NO in step S151, the CPU 11 completes the sequence of processes without altering the setup of the security environment.

Upon receiving a password in step S152, the CPU 11 determines whether or not the password is the right one (step S153). The CPU 11 compares the received password with the password preliminarily stored in the storing unit 15, and when it is determined that the received password is not right (NO in step S153), the sequence of processes is completed. In contrast, when it is determined that the received password is right (YES in step S153), the CPU 11 reads out a screen shown in FIG. 14 from the storing unit 15, and displays the screen. Then, the CPU 11 accepts a setup for the security environment (step S154). In other words, the CPU 11 accepts the selection as to whether or not the authentication process should be carried out. Successively, the CPU 11 determines whether or not the information instructing the execution of the authentication process has been received from the operation unit 13 (step S155). More specifically, the CPU 11 determines whether or not the "security environment" button shown in FIG. 14 has been operated.

When it is determined that the authentication process should be carried out (YES in step S155), that is, when the CPU 11 has received a signal corresponding to the "security environment" button from the operation unit 13, a flag "1" is set in the storing unit 15 (step S156). In contrast, when it is determined that the authentication process need not be carried out (NO in step S155), that is, when the CPU 11 has received a signal corresponding to the "normal" button shown in FIG. 14 from the operation unit 13, a flag "0" is set in the storing unit 15 (step S157). Thus, the user is allowed to select an execution/non-execution of the authentication process. Here, when the flag "1" is set, the CPU 11 executes the security program 151P, carries out an interrupting process, if necessary, and carries out the authentication process. In contrast, when the flag "0" is set, the CPU 11 does not execute the security program 151P.

Figure 16:
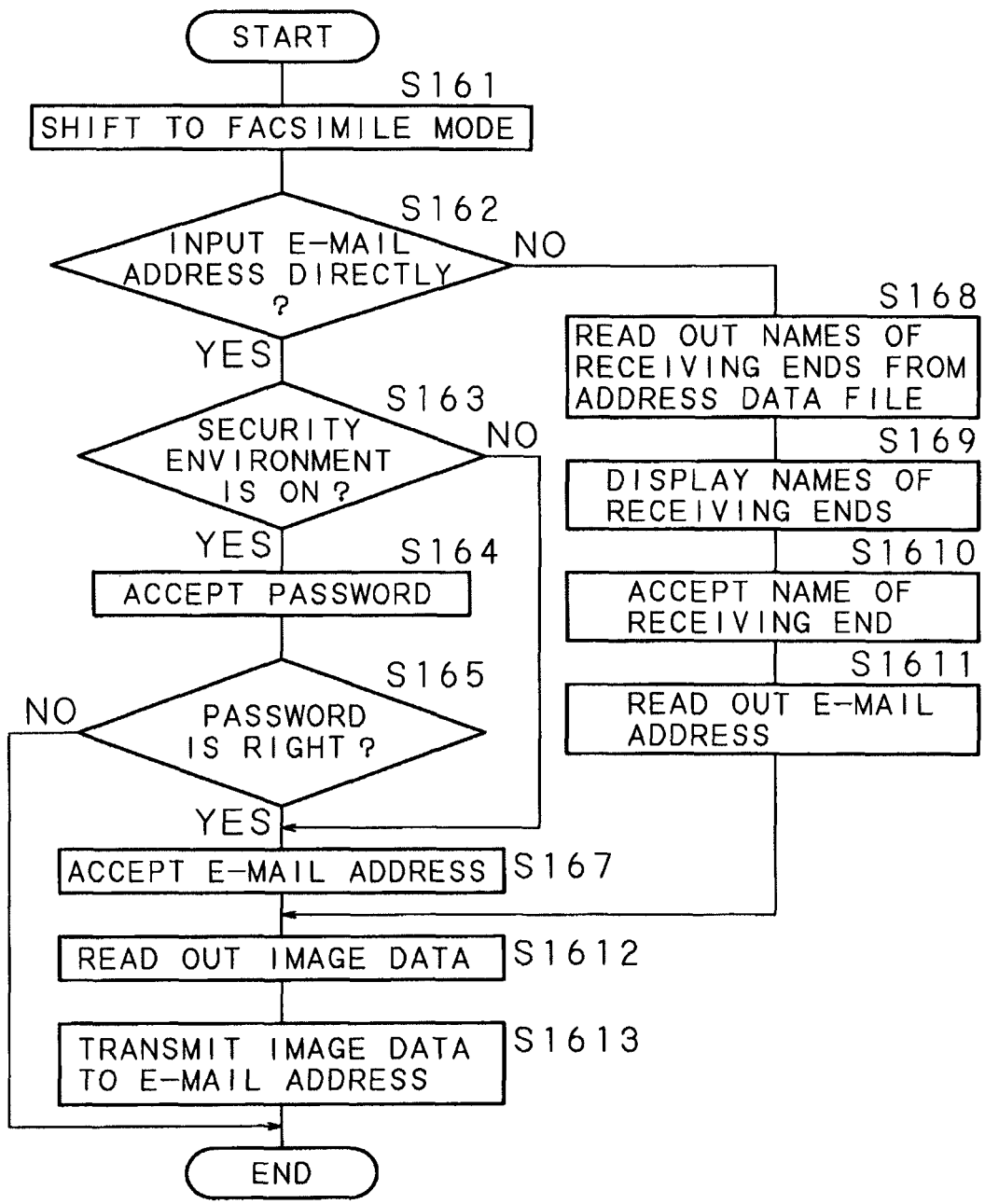
FIG. 16 is a flow chart that shows a sequence of the authentication processes upon inputting an electronic mail address.

FIG. 16 is a flow chart that shows a sequence of authentication processes that is used upon inputting an electronic mail address. First, when the user operates a FAX button 136 shown in FIG. 2, the CPU 11 shifts the sequence to a facsimile mode (step S161). Next, the CPU 11 determines whether or not the user directly inputs an electronic mail address of a receiving end (step S162). In other words, the CPU 11 determines whether or not "E-MAIL address" button, shown in FIG. 3, has been operated. Here, when it is determined that the electronic mail address is directly inputted (YES in step S162), that is, when a signal corresponding to the "E-MAIL address" button has been outputted from the operation unit 13, the CPU 11 determines whether or not the security environment is currently going on (step S163).

More specifically, the CPU 11 determines whether or not the flag stored in the storing unit 15 is "1". When it is determined that the security environment is on (YES in step S163), the CPU 11 accepts an input of a password through the ten keys 131 (step S164). The CPU 11 determines whether or not the password is the right one (step S165). The CPU 11 compares the received password with the password preliminarily stored in the storing unit 15, and when it is determined that the received password is not right (NO in step S165), the sequence of processes is completed. In contrast, when it is determined that the received password is right (YES in step S165), the CPU 11 reads out a screen shown in FIG. 6 from the storing unit 15, and displays the screen.

Then, the CPU 11 accepts an input of an electronic mail address from the ten keys 131 (step S167). In contrast, when it is determined that the security environment is not on in step S163 (NO in step S163), that is, when the CPU 11 determines that the flag in the storing unit 15 is "0", the sequence proceeds to step S167 by skipping processes of steps S164 and S165.

When, an electronic mail address is not directly inputted in step S162 (NO in step S162), that is, when the CPU 11 determines that the "receiving end list" button has been operated by the user so as to call for already registered addresses as shown in FIG. 3, the CPU 11 reads out names of receiving ends from the address data file 152 onto the RAM 12 (step S168). The CPU 11 displays the names of receiving ends read onto the RAM 12 on the display unit 14 as shown in FIG. 4 (step S169). The CPU 11 accepts a selection of the name of the receiving end through the operation unit 13 (step S1610). Based upon the name of the receiving end thus accepted, the CPU 11 retrieves the address data file 152 to read out the corresponding electronic mail address (step S1611).

Thereafter, the CPU 11 reads out image data to be transmitted, from the image memory 151 (step S1612), so that the image data is transmitted to the corresponding electronic mail address (step S1613). In this manner, the authentication process is carried out appropriately in accordance with the setting of the security environment, and in the case where the receiving end has already been registered, the authentication process is omitted; thus, it becomes possible to provide an image transmission apparatus that is more convenient in use, while the security function is properly maintained.

Figure 17:
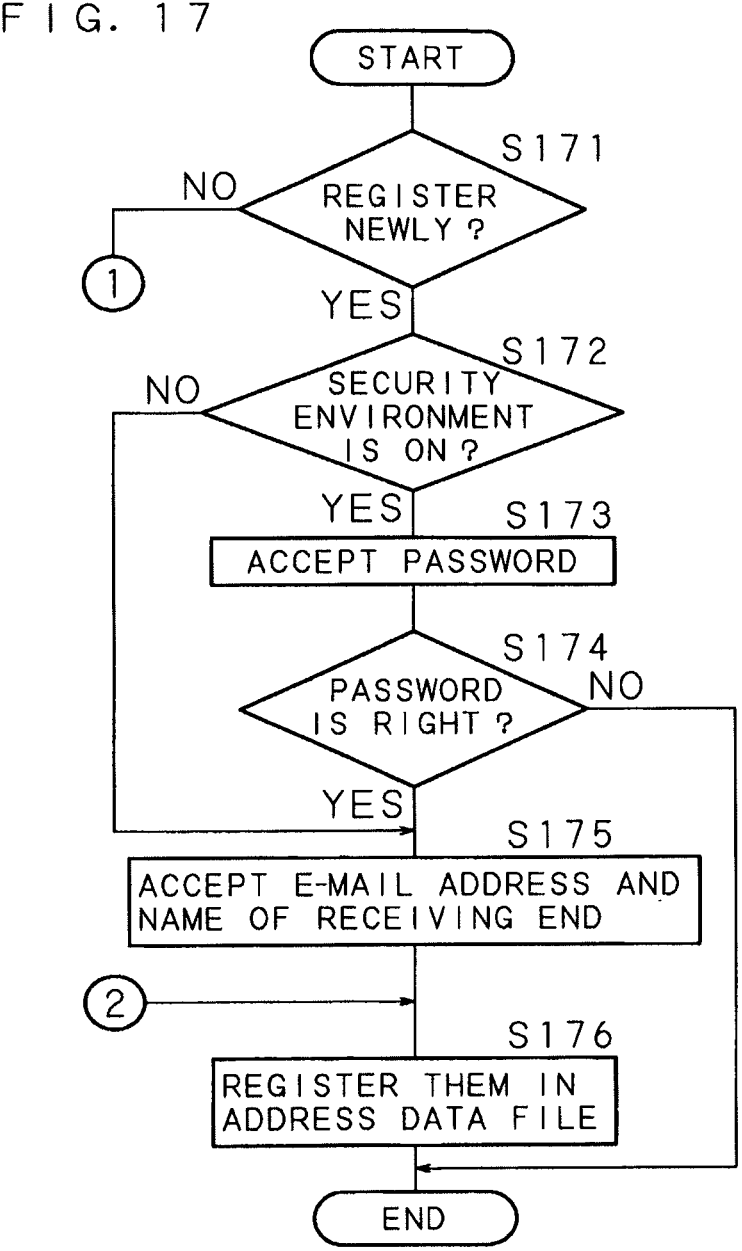
FIG. 17 is a flow chart that shows a sequence of processes in the case where an electronic mail address is newly registered or edited.
Figure 18:
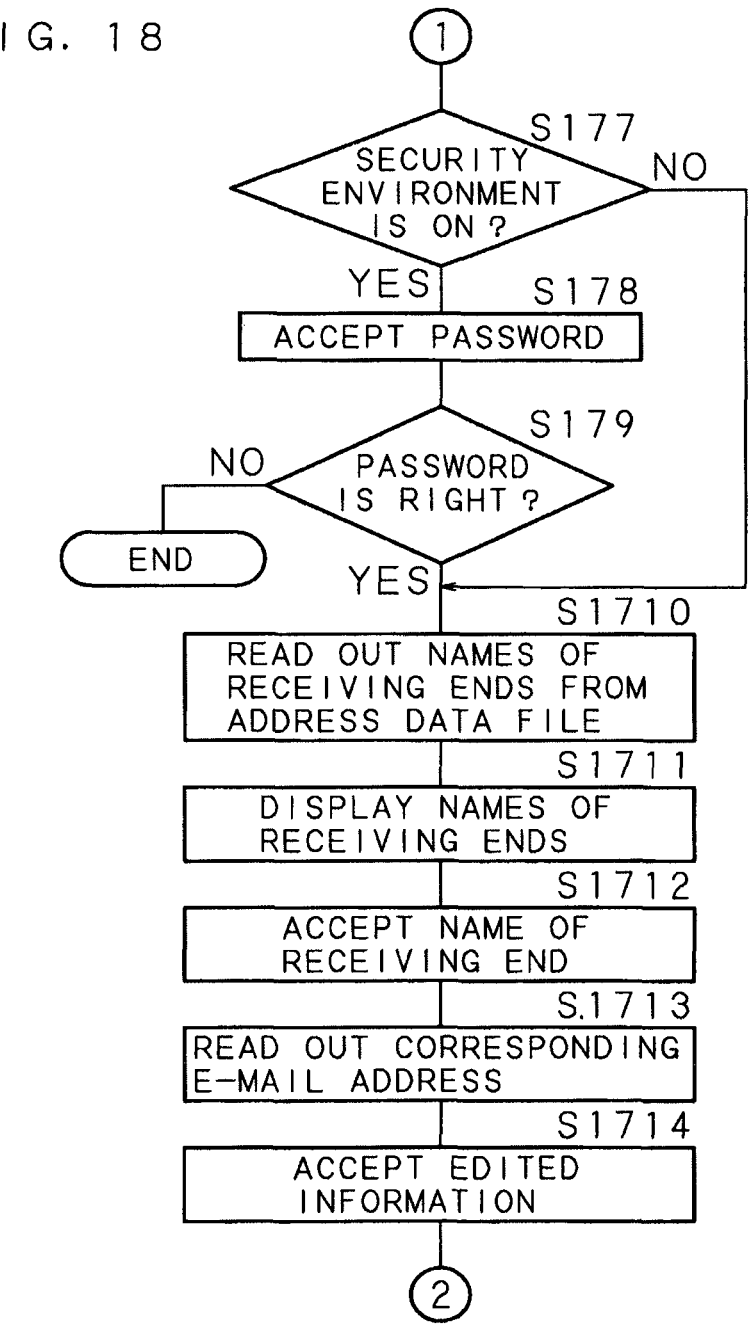
FIG. 18 is a flow chart that shows a sequence of processes in the case where an electronic mail address is newly registered or edited.

FIGS. 17 and 18 are flow charts that show a sequence of processes used for newly registering or editing an electronic mail address. First, the CPU 11 determines whether or not an electronic mail address is newly registered (step S171). More specifically, the CPU 11 determines whether the "newly registering" button or the "registered address editing" button has been operated in FIG. 9. When the CPU 11 determines that the newly registering process is carried out (YES in step S171), that is, when the CPU 11 has received a signal corresponding to the "newly registering" button from the operation unit 13, the CPU 11 determines whether or not the security environment is currently going on (step S172). When the CPU 11 determines that the security environment has been set (YES in step S172), the CPU 11 accepts an input of a password from the ten keys 131 (step S173).

The CPU 11 determines whether or not the password is the right one (step S174). The CPU 11 compares the received password with the password preliminarily stored in the storing unit 15, and when it is determined that the received password is not right (NO in step S174), the sequence of processes is completed. In contrast, when it is determined that the received password is right (YES in step S174), the CPU 11 reads out a screen shown in FIG. 10 from the storing unit 15, and displays the screen. When it is determined that the security environment has not been set in step S172 (NO in step S172), processes in steps S173 and S174 are skipped. Then, inputs of a name of a receiving end, the electronic mail address and the like are accepted (step S175). The CPU 11 registers the name of a receiving end and the electronic mail address thus accepted in the address data file 152 (step S176).

When it is determined that the corresponding process is not a newly registering process in step S171 (NO in step S171), that is, when the CPU 11 has received a signal corresponding to the "registered address editing" button shown in FIG. 9, the CPU 11 determines whether or not the security environment has been set (step S177). When the CPU 11 has determined that the security environment has been set (YES in step S177), the CPU 11 accepts an input of a password through the ten keys 131 (step S178).

The CPU 11 determines whether or not the password is the right one (step S179). The CPU 11 compares the received password with the password preliminarily stored in the storing unit 15, and when it is determined that the received password is not right (NO in step S179), the sequence of processes is completed. In contrast, when it is determined that the received password is right (YES in step S179), the sequence proceeds to step S1710. When it is determined that the security environment has not been set in step S177 (NO in step S177), processes in steps S178 and S179 are skipped.

Next, the CPU 11 reads out names of receiving ends from the address data file 152 onto the RAM 12 (step S1710). The CPU 11 displays the names of receiving ends read out onto the RAM 12 on the display unit 14 as shown in FIG. 11 (step S1711). The CPU 11 accepts a selection of the name of the receiving end to be edited through the operation unit 13 (step S1712). Based upon the name of the receiving end thus accepted, the CPU 11 retrieves the address data file 152 to read out the corresponding electronic mail address or the like (step S1713). Thus, the electronic mail address, the name of the receiving end etc. to be edited are displayed as shown in FIG. 12. The user inputs edit information such as an electronic mail address through the ten keys 131. The CPU 11 accepts information that has been edited (step S1714), and updates and registers the edited information thus accepted in the address data file 152 in association with the name of the receiving end (step S176). In this manner, upon newly registering or editing information in the address data file 152, the authentication process is also carried out, if necessary; therefore, it becomes possible to avoid the problem that the third person secretly registers or alters any receiving end.

Embodiment 2

Figure 19:
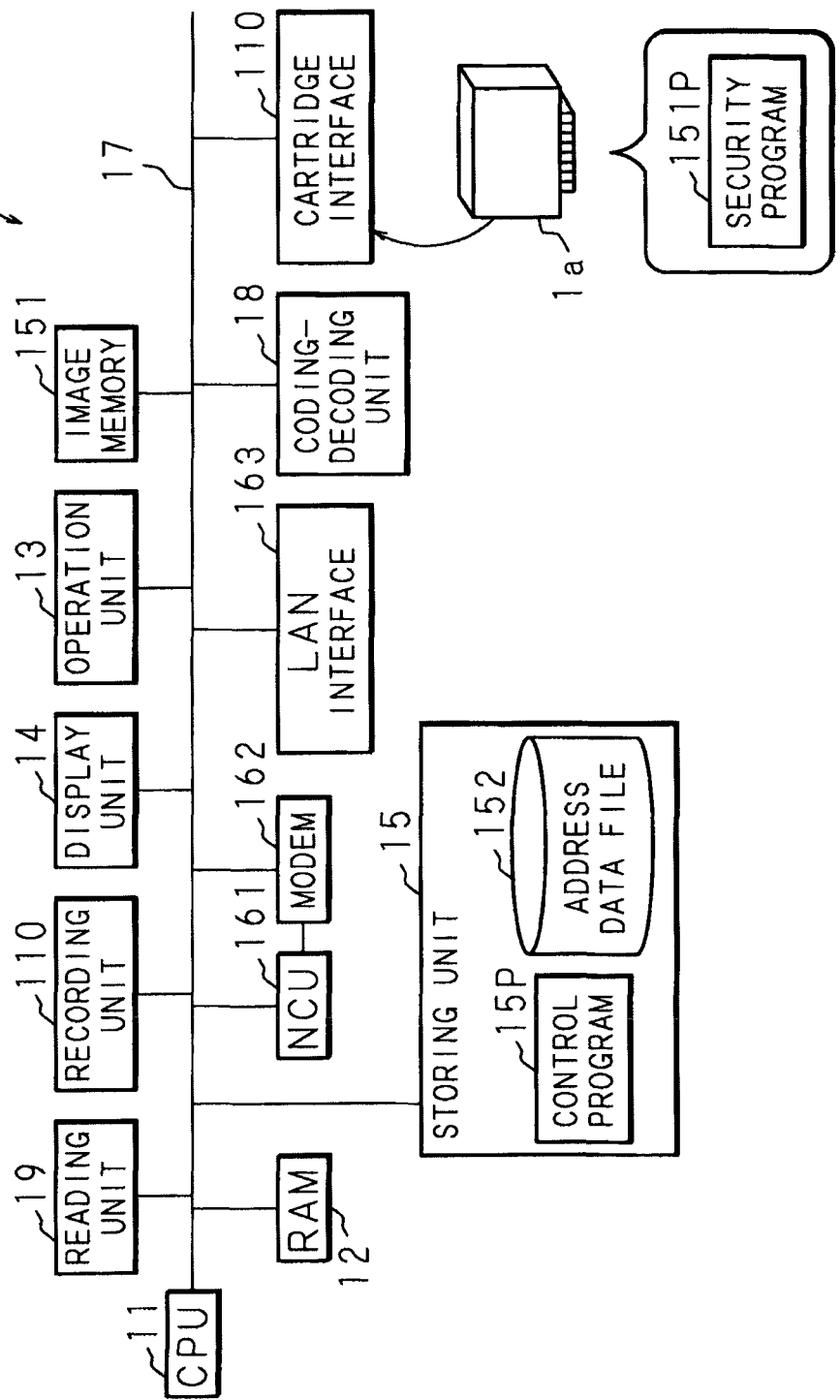
FIG. 19 is a block diagram that shows a hardware structure of an image transmission apparatus according to Embodiment 2.

Although Embodiment 1 has an arrangement in which the security program 151P used for carrying out the authentication process is preliminarily installed in the storing unit 15, another arrangement in which a recording medium such as a cartridge ROM that stores the security program 151P is separately attached may be used to achieve functions of the image transmission apparatus according to the present invention. FIG. 19 is a block diagram that shows a hardware structure of an Internet facsimile apparatus 1 according to Embodiment 2. In FIG. 19, reference numeral 1a represents a cartridge ROM in which the security program 151P is stored. When physically attached to a cartridge interface 110, the cartridge ROM 1a is allowed to function in the same manner as the security program 151P that is pre-installed as described in Embodiment 1. In other words, the selection process as to whether or not the authentication process should be carried out is executed in accordance with the flow chart of FIG. 15, and in the case of the execution of the authentication process, since the flag is set to "1", the security program 151P is appropriately executed as an interrupting process. In contrast, when the flag is set to "0", the security program 151P is not executed, with the result that the authentication process is not carried out.

Embodiment 2 has the above-mentioned arrangement, and since the other structures and functions are the same as those of Embodiment 1, the corresponding parts are indicated by the same reference numerals, and the detailed description thereof is omitted.

INDUSTRIAL APPLICABILITY

As described above, in the present invention, upon input of an address through input means used for inputting an address of a receiving end, an image transmission apparatus carries out an authentication process that determines whether or not the inputting person is a right authorized person. When it is determined that the corresponding operation is right through the authentication process, the image transmission apparatus transmits image data to the address of the receiving end thus inputted. With this arrangement, it becomes possible to prevent the problem that image data might be leaked to the third person through a network.

Moreover, in the present invention, when it is determined that the corresponding operation is right through the authentication process, the image transmission apparatus registers the inputted address in the address data file. Upon editing an already registered address, the image transmission apparatus reads out the address that has been registered in the address data file, and when the address thus read out is edited, the authentication process is again carried out. When it is determined that the corresponding operation is right through the authentication process, the edited address is updated and registered in the address data file. With this arrangement, it becomes possible to prevent the problem that the third person with an ill intention might freely alter the receiving end.

Moreover, in the present invention, when an already registered address of a receiving end is read out from the address data file, the image transmission apparatus transmits image data to the corresponding address without carrying out the authentication process. Therefore, it becomes possible to provide an image transmission apparatus that is more convenient in use with superior security.

Furthermore, in the present invention, upon raising the level of security, the image transmission apparatus is allowed to execute the authentication process, while, when emphasis is placed on convenience in use rather than security, the image transmission apparatus is not allowed to execute the authentication process. With this arrangement, it becomes possible to provide an image transmission apparatus that is suitable for the use environment of the user; thus, the present invention exerts superior effects.

The invention claimed is:

1. An image transmission apparatus which transmits image data, comprising:
    an input unit through which an address of a receiving end is inputted;
    a transmitting unit transmitting image data to an address of a receiving end inputted through the input unit;
    a storing unit storing an address of a receiving end inputted through the input unit;
    a receiving unit receiving a setting of enabling or disabling of a security environment; and
    a controller carrying out an authentication process as to whether or not an operator is an authorized person before the receiving unit receives the setting,
    wherein the address includes a FAX number and an electronic mail address,
    when enabling of a security environment is set, the controller permits transmission of image data to an electronic mail address stored in the storing unit, and carries out an authentication process as to whether or not an inputting person is an authorized person before image data is transmitted to an electronic mail address directly inputted through the input unit by the inputting person.

2. The image transmission apparatus according to claim 1, wherein when enabling of a security environment is set, the controller restricts editing of an electronic mail address stored in the storing unit.

3. The image transmission apparatus according to claim 2, wherein when an electronic mail address stored in the storing unit is edited, the controller carries out an authentication process as to whether or not an operator is an authorized person.

4. The image transmission apparatus according to claim 3, wherein after the receiving unit receives a request to edit an electronic mail address stored in the storing unit, the controller carries out an authentication process as to whether or not an operator is an authorized person.

5. A method of controlling an image transmission apparatus according to claim 1.

* * * * *